Aug. 13, 1940.  D. R. BERLIN  2,211,089
WING AND FUSELAGE CONSTRUCTION
Filed March 29, 1938
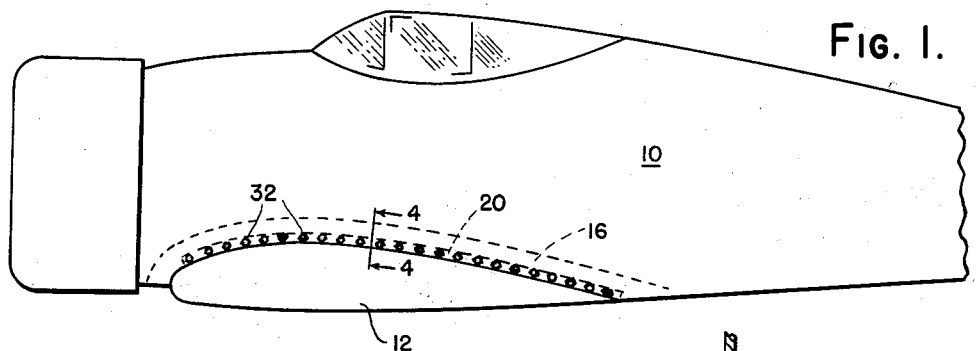
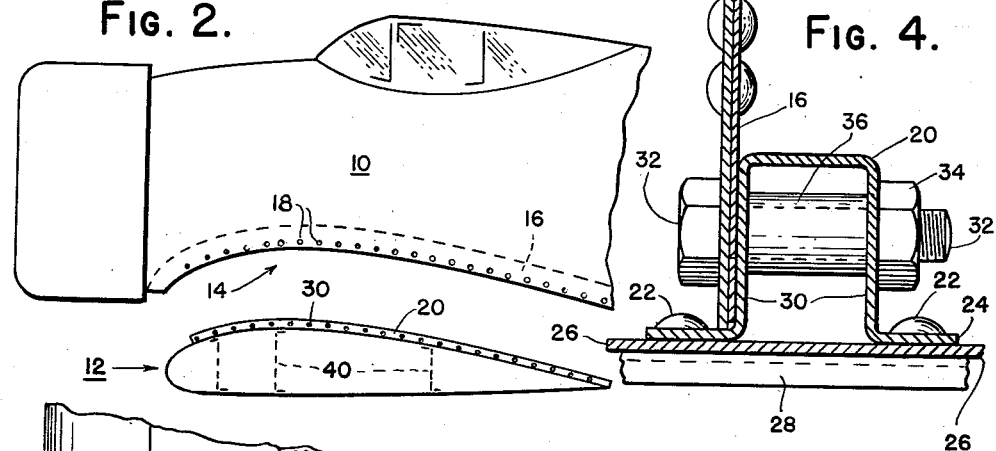
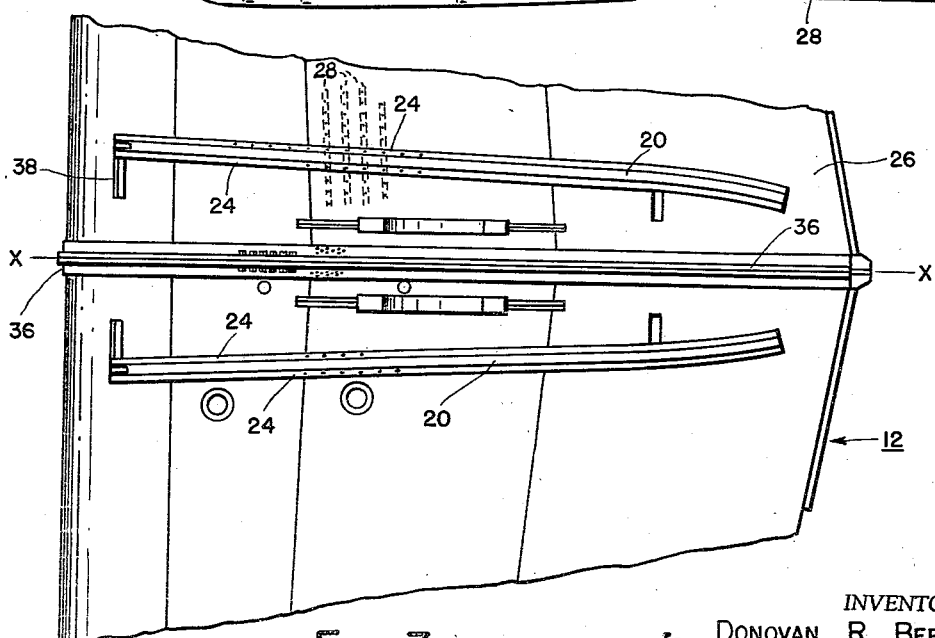
INVENTOR.
DONOVAN R. BERLIN
BY
ATTORNEY.

Patented Aug. 13, 1940

2,211,089

UNITED STATES PATENT OFFICE 2,211,089

WING AND FUSELAGE CONSTRUCTION

Donovan R. Berlin, Eggertsville, N. Y., assignor to Curtiss-Wright Corporation, a corporation of Delaware Application March 29, 1938, Serial No. 198,647

4 Claims. (Cl. 244—117)

This invention relates to aircraft construction and more particularly to a method of joining the airfoils to the fuselage.

One object of my invention is to provide an improved means of attaching an airfoil to an aircraft fuselage which shall be of simple construction, shall permit easy attachment and detachment and which shall be of requisite strength to transmit the wing loading under all conditions likely to be encountered during flight or landing of the aircraft.

Another object is the provision of a connective means of this type whereby a monocoque wing may be attached to a stressed skin monocoque fuselage in such a manner that the two may be joined to function as an aerodynamic streamlined unit and which may be readily separated for purposes of repair or replacement.

Another object lies in the provision of a substantially rigid attachment member which may be fixed to a series of ribs of an airfoil and by which the airfoil may be attached to a fuselage by means of a series of bolts or other suitable connecting means.

Another object is to provide a connecting means whereby a unitary wing of unbroken span and airfoil section may be set into a complementary recess in a monocoque fuselage and be attached thereto substantially along the meeting line of the fuselage and wing, without disturbing the wing surface or its stress carrying qualities.

Still another object is to provide means for locally strengthening a stressed skin wing so that in attaching the fuselage directly to the wing skin the stresses concentrated at the point of attachment will be transmitted to and distributed over a considerable area of the wing in a spanwise direction.

Other objects and characteristics of my invention will be apparent from the following description and from the accompanying drawing, in which —

Fig. 1 is a side elevation of an airplane fuselage and wing joined according to this invention;

Fig. 2 is a similar side elevation showing the wing detached from the fuselage;

Fig. 3 is a fragmentary plan view of the wing midsection showing the attachment members; and Fig. 4 is a typical cross-sectional view taken on the line 4—4 of Fig. 1, of one attachment member, or channel, showing its attached relationship to the reenforced fuselage skin and its fixed relationship to the reenforced wing skin.

In assembling aircraft bodies, the joining of the sustaining surfaces to the fuselage has heretofore been accomplished in various more or less complicated ways and it is the purpose of this invention to introduce a new and greatly simplified manner of attachment. The advantages of being able to quickly and easily attach or detach a monocoque stressed skin wing are very important, not only during original assembly but also at any time during the life of the airplane. The objects of this invention are arrived at in the present preferred embodiment which is illustrated as applied to a monocoque stressed skin fuselage 10 and an associated unitary wing 12 of similar construction. It is preferable, though not necessary from the standpoint of this invention, that the fuselage be complementarily cut out as shown at 14 to conform to the outline of the adjacent surface of the wing 12 so that when in assembled relation the wing and fuselage will form an aerodynamically unified structure wherein the wing lower surface will merge into and carry out the streamlined contour of the fuselage undersurface.

In adapting this invention to practical use the fuselage is first formed with a cut-out portion as just described and then the fuselage skin adjacent to the resilient opening is suitably reenforced so as to have a high degree of local strength. One method of accomplishing this is as shown in detail in Fig. 4 wherein a double thickness of fuselage metal is provided by riveting a suitably formed metal strip 16 to the periphery of the cut-out opening at 14. Following this a series of bolt holes 18 of suitable spacing and number are punched or drilled through the original skin thickness as well as the thickness of the strip 16. Having accomplished this the fuselage 10 is ready for attachment of the wing.

After the symmetrical halves of the wing 12 have been joined along the line X—X by bolting the flanges 36 together and the wing is otherwise completely assembled, a pair of suitably formed channel or hat-shaped structural members 20 are attached thereto by bolts or other means each of which extends through a flange 24 of the member 20 through the wing covering 26 and into a stiffener 28, which may comprise an inverted channel member extending spanwise of the wing.

The stiffeners 28 serve to distribute the stresses, concentrated at the point of attachment of the wing and fuselage, throughout the span and area of the wing and are provided in sufficient number to accomplish this purpose. These flanges 24 are bent to conform to the airfoil contour of the wing surface which they adjoin and, as explained, their attachment directly to the skin and the underlying series of members 28 allows the load stresses to be transmitted directly to the upper skin surfaces and to be distributed throughout the wing by means of the associated elements of its monocoque construction including the spanwise webs 40. The channel shaped members 20, prior to their assembly, are drilled through their sides or webs 30 so that the holes match the corresponding holes provided in the fuselage 10 previously described. Further, these members are positioned substantially chordwise on the wing surface 26 and spaced symmetrically and in substantial parallelism with the fore and aft line X—X of the wing. In the embodiment shown in Fig. 3 at the section of the wing attachment, the fuselage is tapered somewhat toward the rear, in which case, the members 20 will converge slightly toward the wing center line X—X, as they extend toward the wing trailing edge, so as to conform to the fuselage taper.

With this construction the wing can then be raised into position from below the fuselage until the two component units meet and fit together in a snug engagement. The connection members 38 will be engaged by the fire-wall at the front end of the fuselage and the channel members 20 will then extend up into the fuselage and will snugly engage the inner periphery of the opening 14. The bolt holes in the side walls 30 of the channel members 20 will be in substantial alignment with corresponding holes in the fuselage wall and hence to permanently connect the two together it is only necessary to insert suitable bolts 32 (see Fig. 4) through the holes and apply thereto a lock nut 34. In order to increase the strength and rigidity of the joints and to prevent the crushing of the channels 20, sleeve members 36 may be employed between the side walls 30 of these members 20. In that case each bolt 32 is passed through the bores and one of the sleeves 36.

This construction gives rise to a joint that is of adequate strength and rigidity but which can be readily separated at any time, if desired. Such a joint is not only well adapted for connecting the wing and fuselage in a low wing monoplane type but it is equally adapted for use in the high wing type and this application is intended to fully cover such use as well as the various modifications which are obvious from the preferred showing.

My invention also embraces those aircraft structures wherein a fillet or fairing is provided at the intersection between the fuselage and the wing. In structures of this type the fillet would preferably be a separate fairing member which would be attached to both the fuselage and the wing with an attachment connection at either one or the other to permit its separation when the wing and fuselage are detached from each other.

What I claim is:

1. A joint for the attachment of the wing of an aircraft to the fuselage, comprising a flanged channel fastened through both flanges to the surface of said wing and means for detachably attaching the fuselage skin to the webs of said flanged channel.

2. An aircraft construction, a joint for attaching a stressed skin fuselage to a self-supporting monocoque wing, comprising spaced flanged channels fastened through both flanges to the surface of said wing, said fuselage having a reenforced opening in its skin surface conforming transversely to the cross-section of the adjoining wing surface, said channels disposed chordwise on the wing to conform with the inner periphery of said fuselage opening, and means for attaching the said fuselage skin to the said channels.

3. In aircraft construction, a joint for attaching a stressed skin fuselage to a cantilevered monocoque wing, comprising spaced flanged channels fastened through said flanges to the surface of said wing, said fuselage having a reenforced opening in its skin surface conforming transversely to the cross-section of the adjoining wing surface, said channels disposed chordwise on the wing to conform with the inner periphery of said fuselage opening and means for detachably connecting said fuselage skin to the webs of said channels.

4. In aircraft construction, a joint for attaching a stressed skin fuselage to a self-supporting monocoque wing, comprising spaced flanged channels fastened through said flanges to the surface of said wing, said fuselage having a reenforced opening in its skin surface conforming transversely to the cross-section of the adjoining wing surface, said channels being disposed chordwise on the wing to conform with the inner periphery of said fuselage opening and arranged with transverse channel portions for attachment to the fuselage fire-wall, and means for detachably connecting said fuselage skin and fire-wall to the webs of said channels.

DONOVAN R. BERLIN.